D. T. MAY.
PROTECTIVE DEVICE.
APPLICATION FILED OCT. 23, 1918.
1,362,337.
Patented Dec. 14, 1920.
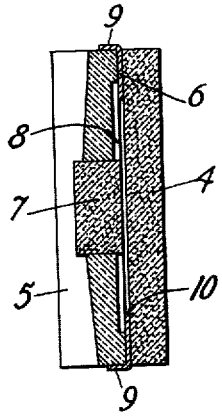
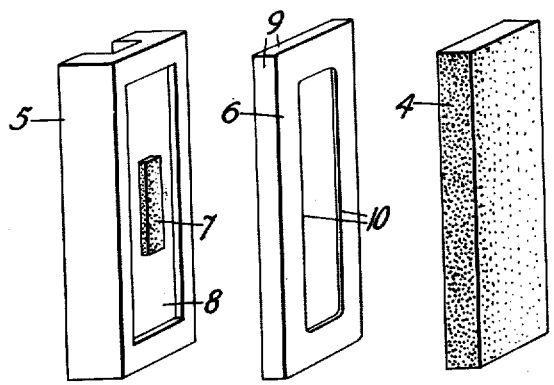
Inventor:
David T. May
by [signature] Att'y.

UNITED STATES PATENT OFFICE.

DAVID T. MAY, OF NEW YORK, N. Y., ASSIGNOR TO WESTERN ELECTRIC COMPANY, INCORPORATED, OF NEW YORK, N. Y., A CORPORATION OF NEW YORK.

PROTECTIVE DEVICE.

1,362,337.　　　　　Specification of Letters Patent.　　Patented Dec. 14, 1920.

Application filed October 23, 1918. Serial No. 259,433.

*To all whom is may concern:*

Be it known that I, DAVID T. MAY, a citizen of the United States, residing at New York, in the county of New York, State of New York, have invented certain new and useful Improvements in Protective Devices, of which the following is a full, clear, concise, and exact description.

This invention relates to protective devices and in particular to an open space cut-out for protection against dangerous potentials.

In the type of open space cut-out commonly employed for the protection of telephone or signaling lines a pair of conducting blocks are accurately spaced apart in such a way as to provide a spark gap of the desired dimension. In order that the apparatus operate satisfactorily to provide the proper degree of protection against dangerous potentials, it is necessary that the spacing means be held to very close limits and accurately positioned between the opposing electrodes. Because of the close limits to which sheet metal can be held commercially, this material lends itself readily for use as a separator in apparatus where a separator of conducting material can be used.

It is the object of the present invention to provide an open space cut-out so arranged that a separator of sheet metal may be used for determining the dimension of the air gap between opposing blocks and means provided for maintaining the separator in a suitable position with respect to one of the electrodes. A feature of the invention accordingly resides in the use in an open space cut-out of a metal separator so arranged as to provide an accurate spacing means between opposing blocks and provided with down-turned edges whereby it is held in the desired position with respect to one of the conducting blocks. This feature of the invention may be more clearly understood by reference to the drawing, in which Figure 1 is a view partly in section showing the various parts of the cut-out assembled in operative position, and Fig. 2 is a view showing in perspective, the various elements of the cut-out arranged in alinement for assembly.

The protector embodying the features of this invention consists of a conducting block 4 of carbon or other conducting material adapted to be mounted in opposition to a somewhat similar block 5 of insulating material but separated therefrom by means of the sheet metal separator 6. The block 5 which is preferably of porcelain or glass, is provided with a central opening in which is rigidly secured the electrode 7 of conducting material. The inner portion of the opposing surface of block 5 is depressed, as shown, thereby providing an open space or moat 8 around the conducting block 7 the active surface of which is in a plane with the outer surface of block 5. The outer edges 9—9 of separator 6 are bent out at an angle of 90° to permit holding the separator in a fixed position with respect to block 5. The inner portion of separator 6 is cut away, as shown, so that the inner edge 10 does not some in contact with the surface of block 5 but lies well within the moat 8 and therefore any burs or rough edges resulting from the punching operation of this part are not in a position to affect the separation between opposing electrodes and consequently the break-down voltage of the protector. From the above it will be apparent that by the means provided in this invention a protector may be constructed in which it is commercially possible to hold the separation between opposing electrodes to very close limits and to obtain this separation without resorting to the use of a dielectric material which is apt to become charred upon the passing of an arc and therefore result in high maintenance and unsatisfactory operation. Moreover with the proposed construction, the design of the separator is such as to completely inclose the chamber surrounding the opposing electrodes, thereby preventing the ingress of any dust which might increase the maintenance of the protector.

What is claimed is:

1. A protector comprising a pair of opposing electrodes, one of said electrodes being centrally located in a block of insulating material, and a separator the edges of which are flanged to fit over the edges of said insulating block to prevent relative transverse movement between the insulating block and the separator.

2. A protector comprising a pair of opposing electrodes, one of said electrodes being centrally located in a block of insulating material, and a sheet metal separator, the edges of which are flanged to fit over the edges of said block to prevent relative transverse movement between the block and the separator.

3. A protector comprising a block of insulating material, an electrode positioned therein, an opposing electrode, and means separating said electrodes, the edges of said separating means being bent to fit over the edges of the insulating block to hold the separating means against movement.

4. A protector comprising a conducting block, an opposing block of insulating material having the inner portion of its opposing surface depressed, an electrode positioned within said block and having its opposing surface in a plane with the outer edges of the insulating block, and means separating the electrodes, the outer edges of said separating means being bent at right angles to fit over the edges of the insulating block and the inner edge of said separating means being arranged to lie over the depressed portion of the insulating block.

5. A protector comprising a conducting block, an opposing block of insulating material having the inner portion of its opposing surface depressed, an electrode positioned within said block and having its opposing surface in a plane with the outer edge of the insulating block, and means separating said opposing and insulating blocks and bearing against the outer edge of the insulating block and coöperating with the depressed portion thereof to form a completely inclosed air chamber about said electrode.

In witness whereof I hereunto subscribe my name this 18th day of October A. D. 1918.

DAVID T. MAY.